United States Patent
Preindl et al.

(10) Patent No.: US 9,200,617 B2
(45) Date of Patent: Dec. 1, 2015

(54) WIND TURBINE FOR GENERATING ELECTRIC ENERGY

(75) Inventors: Matthias Preindl, Rasun-Anterselva (IT); Davide Bagnara, Vipiteno (IT)

(73) Assignee: WILIC S.AR.L., Luxembourg (LU)

( * ) Notice: Subject to any disclaimer, the term of this patent is extended or adjusted under 35 U.S.C. 154(b) by 152 days.

(21) Appl. No.: 14/127,083

(22) PCT Filed: Jun. 28, 2012

(86) PCT No.: PCT/IB2012/053306
§ 371 (c)(1),
(2), (4) Date: May 6, 2014

(87) PCT Pub. No.: WO2013/001496
PCT Pub. Date: Jan. 3, 2013

(65) Prior Publication Data
US 2014/0291989 A1 Oct. 2, 2014

(30) Foreign Application Priority Data
Jun. 28, 2011 (IT) .............................. MI2011A1180

(51) Int. Cl.
*F03D 9/00* (2006.01)
*H02P 9/04* (2006.01)
(Continued)

(52) U.S. Cl.
CPC . *F03D 9/003* (2013.01); *H02J 3/38* (2013.01); *H02M 5/4585* (2013.01); *H02P 9/48* (2013.01); *Y02E 10/763* (2013.01)

(58) Field of Classification Search
USPC .......................... 290/44, 55; 416/1
See application file for complete search history.

(56) References Cited

U.S. PATENT DOCUMENTS 5,083,039 A  1/1992  Richardson et al. ............. 290/44
5,225,712 A * 7/1993  Erdman .......................... 290/44
(Continued)

FOREIGN PATENT DOCUMENTS

WO   WO 2005/027301 A1   3/2005

OTHER PUBLICATIONS

International Search Report and Written Opinion for International Application No. PCT/IB2012/053306 dated Mar. 8, 2013.
(Continued)

*Primary Examiner* — Pedro J Cuevas
(74) *Attorney, Agent, or Firm* — Neal, Gerber & Eisenberg LLP

(57) ABSTRACT

A wind turbine configured to generate electric energy and feed electric energy to an electric power grid, the wind turbine having a blade assembly; an electric machine having a stator, and a rotor connected to the blade assembly to generate electric energy; a first switch converter connected to the electric machine to control stator electric quantities ($I_S$; $V_S$); a second switch converter connected to the electric power grid; and a DC link circuit configured to connect the first switch converter to the second switch converter; the wind turbine being characterized by having a control device which, by at least one of the first and second switch converters, controls a direct voltage ($V_{DC}$) in the DC link circuit on the basis of an operating parameter of the electric machine indicating the stator voltage ($V_S$) of the electric machine, and on the basis of a quantity indicating the line voltage ($V_{lin}$) of the electric power grid.

21 Claims, 3 Drawing Sheets

(51) Int. Cl.
*H02J 3/38* (2006.01)
*H02M 5/458* (2006.01)
*H02P 9/48* (2006.01)
*B64C 11/00* (2006.01)

(56) References Cited

U.S. PATENT DOCUMENTS

| | | | |
|---|---|---|---|
| 7,239,036 B2* | 7/2007 | D'Atre et al. | 290/44 |
| 7,629,705 B2* | 12/2009 | Barker et al. | 290/55 |
| 7,843,078 B2* | 11/2010 | Santiago et al. | 290/44 |
| 7,987,067 B2* | 7/2011 | Harrison et al. | 702/122 |
| 8,018,082 B2* | 9/2011 | Scholte-Wassink et al. | 290/44 |
| 8,022,565 B2* | 9/2011 | Scholte-Wassink et al. | 290/44 |
| 8,093,741 B2* | 1/2012 | Ritter et al. | 290/44 |
| 8,215,896 B2* | 7/2012 | Kooijman et al. | 415/1 |
| 8,249,852 B2* | 8/2012 | Thulke | 703/18 |
| 8,258,642 B2* | 9/2012 | Koerber | 290/44 |
| 8,310,074 B2* | 11/2012 | Larsen et al. | 290/44 |
| 8,426,995 B2* | 4/2013 | Langel | 290/44 |
| 8,451,573 B1* | 5/2013 | Klumper | 361/91.1 |
| 8,519,568 B2* | 8/2013 | Langel | 307/85 |
| 8,610,306 B2* | 12/2013 | Kirchner | 307/43 |
| 8,664,788 B1* | 3/2014 | Wagoner et al. | 290/44 |
| 8,853,876 B1* | 10/2014 | Wagoner et al. | 290/44 |
| 9,014,861 B2* | 4/2015 | Attia | 700/280 |
| 9,046,077 B2* | 6/2015 | Kirchner et al. | 1/1 |
| 9,080,553 B2* | 7/2015 | Haag et al. | 1/1 |
| 2007/0024059 A1* | 2/2007 | D'Atre et al. | 290/44 |
| 2007/0121354 A1 | 5/2007 | Jones et al. | 363/47 |
| 2007/0132248 A1* | 6/2007 | Weng et al. | 290/44 |
| 2008/0093853 A1* | 4/2008 | Barker et al. | 290/44 |
| 2008/0150285 A1* | 6/2008 | Corcelles Pereira et al. | 290/44 |
| 2010/0133826 A1* | 6/2010 | Santiago et al. | 290/44 |
| 2010/0133831 A1* | 6/2010 | Scholte-Wassink et al. | 290/44 |
| 2010/0140939 A1* | 6/2010 | Scholte-Wassink et al. | 290/44 |
| 2011/0018270 A1* | 1/2011 | Corcelles Pereira et al. | 290/44 |
| 2011/0101689 A1* | 5/2011 | Larsen et al. | 290/44 |
| 2011/0133458 A1* | 6/2011 | Harrison et al. | 290/44 |
| 2011/0140430 A1* | 6/2011 | Ritter et al. | 290/44 |
| 2011/0142634 A1* | 6/2011 | Menke et al. | 416/46 |
| 2011/0211951 A1* | 9/2011 | Kooijman et al. | 416/1 |
| 2012/0029892 A1* | 2/2012 | Thulke | 703/7 |
| 2012/0061964 A1* | 3/2012 | Kirchner | 290/44 |
| 2012/0101643 A1* | 4/2012 | Kirchner et al. | 700/287 |
| 2012/0133142 A1* | 5/2012 | Langel | 290/55 |
| 2012/0136494 A1* | 5/2012 | Kirchner et al. | 700/287 |
| 2012/0139243 A1* | 6/2012 | Koerber | 290/44 |
| 2012/0139344 A1* | 6/2012 | Langel | 307/64 |
| 2013/0147201 A1* | 6/2013 | Roesner et al. | 290/55 |
| 2013/0154263 A1* | 6/2013 | Attia | 290/44 |
| 2013/0181450 A1* | 7/2013 | Narayana et al. | 290/44 |
| 2013/0187382 A1* | 7/2013 | Haag et al. | 290/44 |
| 2013/0234434 A1* | 9/2013 | Langel | 290/44 |
| 2013/0301167 A1* | 11/2013 | Langel | 361/21 |
| 2013/0307271 A1* | 11/2013 | Langel | 290/44 |
| 2013/0334817 A1* | 12/2013 | Scholte-Wassink | 290/44 |
| 2014/0030089 A1* | 1/2014 | Wickstrom | 416/1 |
| 2014/0037447 A1* | 2/2014 | Attia | 416/1 |
| 2014/0070535 A1* | 3/2014 | Wagoner et al. | 290/44 |
| 2014/0193254 A1* | 7/2014 | Gopolan et al. | 416/1 |
| 2014/0312620 A1* | 10/2014 | Korber et al. | 290/44 |

OTHER PUBLICATIONS

Notification Concerning Submission, Obtention or Transmittal of Priority Document (Form PCT/IB/304) for International Application No. PCT/IB2012/053306 dated Sep. 24, 2012.
Response to International Search Report and the associated Written Opinion for International Application No. PCT/IB2012/053306 dated Jun. 4, 2013.
PCT Demand (Form PCT/IPEA/401) for International Application No. PCT/IB2012/053306.
Notification of Receipt of Demand by Competent International Preliminary Examining Authority (Form PCT/IPEA/402) for International Application No. PCT/IB2012/053306 dated Jun. 11, 2013.
Written Opinion of the International Preliminary Examining Authority (Form PCT/IPEA/408) for Internatoin Application No. PCT/IB2012/053306 dated Jul. 8, 2013.
Response to Written Opinion for International Application No. PCT/IB2012/053306 dated Sep. 6, 2013.
Notification of Transmittal of the International Preliminary Report on Patentability (Form PCT/IPEA/416) for International Application No. PCT/IB2012/053306 dated Sep. 23, 2013.
International Preliminary Report on Patentability (Form PCT/IPEA/409) for International Application No. PCT/IB2012/053306 dated Sep. 23, 2013.
Ryan M. J. et al, "A power-mapping variable-speed control technique for a constant-frequency conversion system powered by a IC engine and PM generator", Industry Applications Conference, 2000.

* cited by examiner

WIND TURBINE FOR GENERATING ELECTRIC ENERGY

PRIORITY CLAIM

This application is a national stage application of PCT/IB2012/053306, filed on Jun. 28, 2012, which claims the benefit of and priority to Italian Patent Application No. MI2011A 001180, filed on Jun. 28, 2011, the entire contents of which are each incorporated by reference herein.

BACKGROUND

One known wind turbine is described in U.S. Pat. No. 5,083,039.

The wind turbine supplies energy to the grid at a given or designated voltage, which must be the same as the grid voltage, and supplies a given or designated current. The grid voltage is determined by the power server to which the wind turbine is connected, whereas current supply depends on wind conditions and server power demand.

The grid voltage is not perfectly constant, but has a reference value about which the grid voltage can vary by roughly 10%; and wind turbine voltage must equal and follow variations in grid voltage.

To maximize conversion of kinetic wind energy to electric energy, modern wind turbines can adapt the speed of the rotor to wind strength, so the voltage and/or current of the electric machine vary in amplitude and frequency, depending on the speed of the rotor.

For the wind turbine to function properly, adjustments are therefore needed, and which are made by the first and second switch converter.

The first switch converter comprises switches, and acts on the electric machine current and/or voltage to control the electric machine and electric energy flow from the electric machine to the DC link circuit.

The second switch converter also comprises switches, and is configured to connect the DC link circuit and the grid, and to control electric energy transfer from the DC link circuit to the grid. More specifically, the second converter acts on respective switches to couple the direct voltage of the DC link circuit to the grid voltage, or vice versa.

The direct voltage of the DC link circuit is fixed, and is set at the design stage to a value of √2 times whichever is higher: the maximum possible voltage of the electric machine, or the maximum possible grid voltage.

So designed, the electric machine can function over a wide range of wind speeds, and the direct voltage always being higher than the electric machine and grid voltages prevents undesired turn-on of the diodes connected to the converter switches. Known turbines pose problems caused by inevitable switching losses, which normally depend on the voltage and current of the switch involved and the time taken for the turbine to switch. Since these values are normally fairly high, the amount of power dissipated by switching on known turbines is significant and has a noticeable effect on performance.

Moreover, when using certain control techniques, such as discontinuous pulse-width modulation, power dissipation also depends on the total number or quantity of switching operations, which varies. Discontinuous pulse-width modulation, in fact, acts on the number or quantity of switching operations per period and the duration of the switching operations per period to adjust the output voltage of the converter, so the amount of power dissipated increases in direct proportion to the number or quantity of switching operations per period.

SUMMARY

The present disclosure relates to a wind turbine configured to generate electric energy and feed electric energy to an electric power grid.

More specifically, the present disclosure relates to a wind turbine configured to generate and feed electric energy to an electric power grid, comprising:
  a blade assembly;
  an electric machine comprising a stator; and a rotor connected to the blade assembly to generate electric energy;
  a first switch converter connected to the electric machine to control stator electric quantities;
  a second switch converter connected to the electric power grid; and
  a DC link circuit configured to connect the first switch converter to the second switch converter.

It is an advantage of the present disclosure to provide a wind turbine of the above type configured to produce electric energy, and configured to eliminate certain of the drawbacks of certain of the known art.

More specifically, it is an advantage of the present disclosure to provide a wind turbine of the above type configured to produce electric energy, and configured to reduce power dissipation.

According to the present disclosure, there is provided a wind turbine configured to generate and feed electric energy to an electric power grid, the wind turbine comprising:
  a blade assembly;
  at least one electric machine comprising a stator, and a rotor connected to the blade assembly to generate electric energy;
  a first switch converter connected to the electric machine to control stator electric quantities;
  a second switch converter connected to the electric power grid; and
  a DC link circuit configured to connect the first switch converter to the second switch converter;
  the wind turbine being characterized by comprising a control device which, by at least one of the first and second switch converters, controls a direct voltage in the DC link circuit on the basis of an operating parameter of the electric machine indicating the stator voltage of the electric machine, and on the basis of a quantity indicating the line voltage of the electric power grid.

By virtue of the present disclosure, the direct voltage adapts to the variable stator voltage of the electric machine, and to the variable line voltage of the electric power grid, thus making it possible to maintain target or practically ideal ratios between the direct voltage and the stator voltage of the electric machine, and between the direct voltage and the line voltage of the electric power grid—which, as stated, determine the switching losses. In known turbines, on the other hand, the direct voltage is not controlled, and is set once and for all on the basis of the maximum predicted stator and line voltages, which, in actual operating conditions, however, inevitably vary, with negative effects on switching losses.

The turbine according to the disclosure therefore is configured to, on average, reduce power dissipation caused by switching of the converters.

Moreover, when using the discontinuous pulse-width modulation technique, the favourable ratios between the direct voltage and the stator and line voltages also reduce the number or quantity of switching operations, thus further reducing power dissipation caused by switching losses, at least for one of the first and second switch converters.

A further advantage of the present disclosure is to provide a method of controlling a wind turbine configured to generate electric energy.

According to the present disclosure, there is provided a method of controlling a wind turbine configured to generate electric energy, the wind turbine comprising:
 a blade assembly;
 at least one electric machine comprising a stator; and a rotor connected to the blade assembly to generate electric energy;
 a first switch converter connected to the electric machine to control stator electric quantities;
 a second switch converter connected to an electric power grid; and
 a DC link circuit configured to connect the first switch converter to the second switch converter;
 the method comprising controlling, by at least one of the first and second switch converters, a direct voltage in the DC link circuit on the basis of an operating parameter of the electric machine indicating the stator voltage of the electric machine, and on the basis of a quantity indicating the line voltage of the electric power grid.

Additional features and advantages are described in, and will be apparent from the following Detailed Description and the figures.

BRIEF DESCRIPTION OF THE DRAWINGS

A non-limiting embodiment of the present disclosure will be described by way of example with reference to the accompanying drawings, in which.

DETAILED DESCRIPTION

Figure 1:
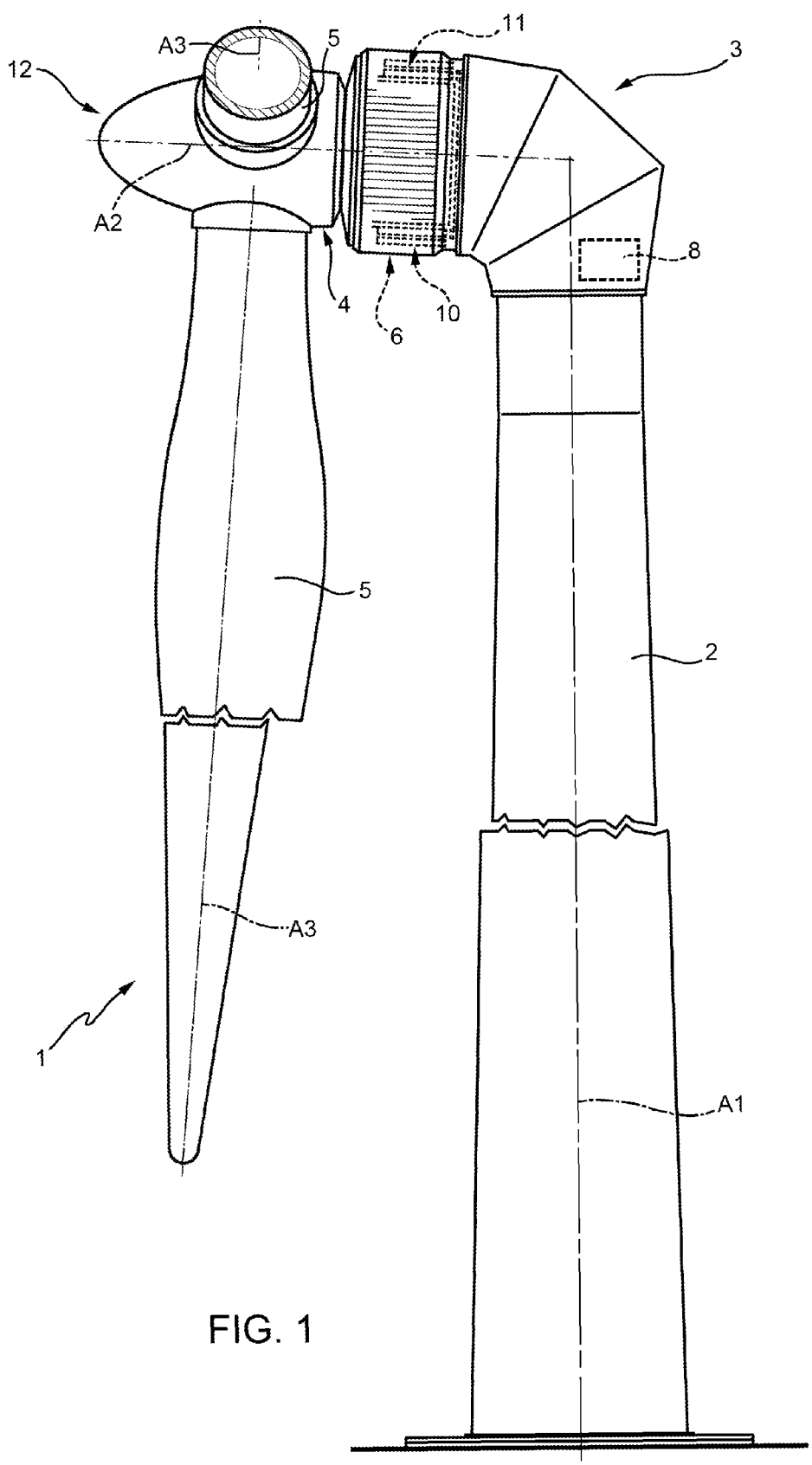
FIG. 1 shows a partly sectioned side view, with parts removed for clarity, of a wind turbine in accordance with one embodiment of the present disclosure.
Figure 2:
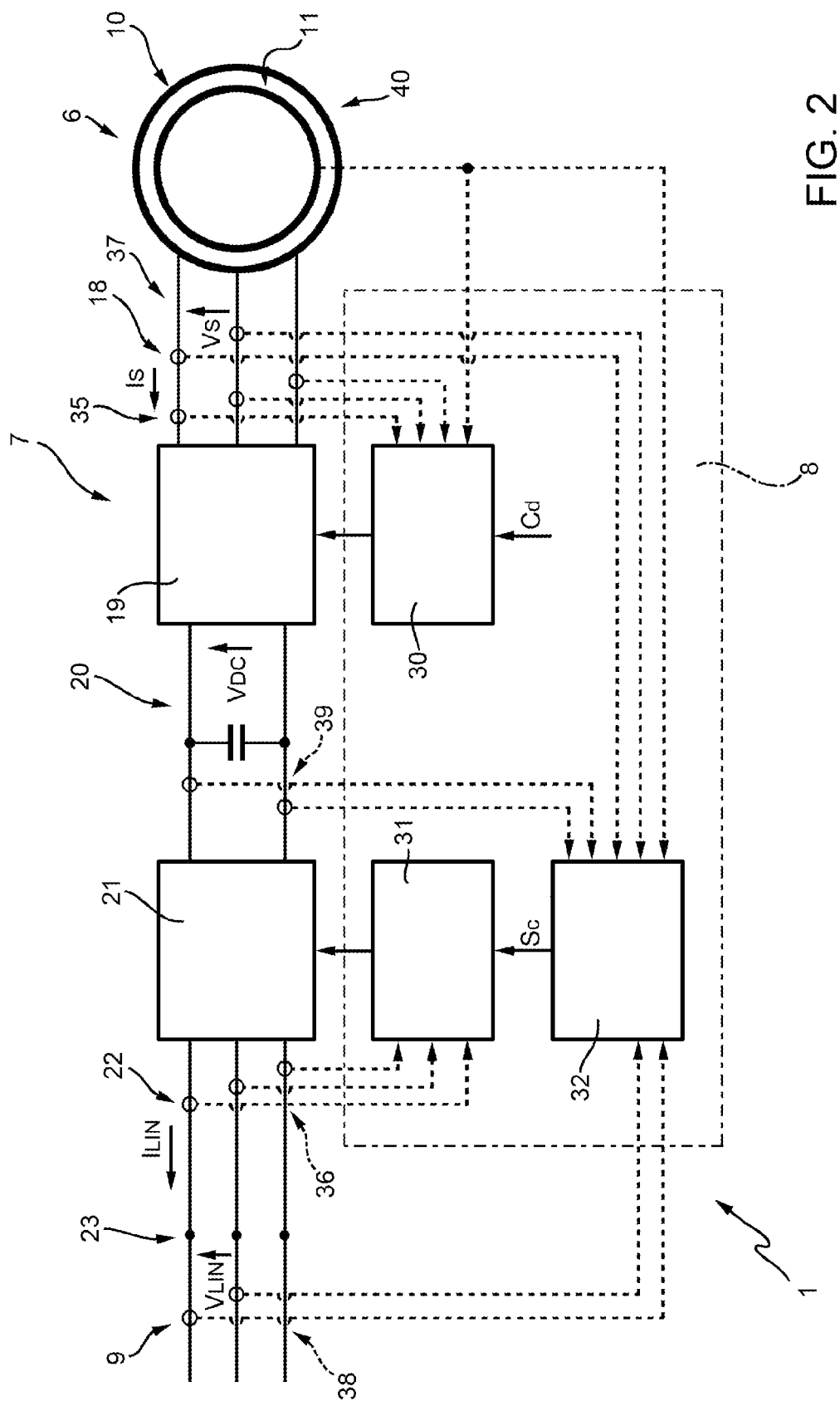
FIG. 2 shows an operating block diagram of the FIG. 1 embodiment of the wind turbine.
Figure 3:
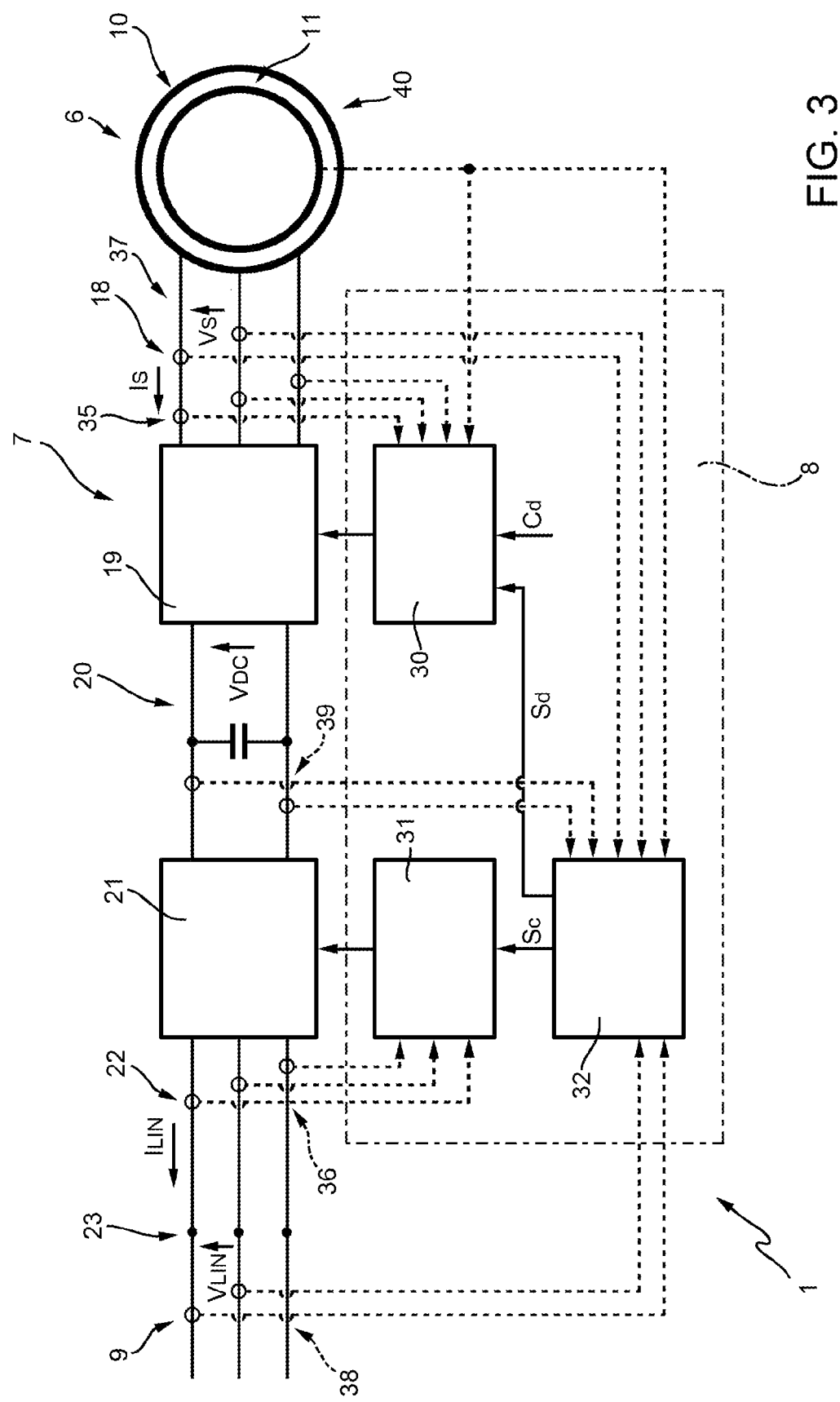
FIG. 3 shows an operating block diagram of an alternative embodiment of the wind turbine to the one in FIG. 2.

Referring now to the example embodiments of the present disclosure illustrated in FIGS. 1 to 3, number 1 in FIG. 1 indicates a wind turbine—in the example shown, a direct-drive, variable-angular-speed wind turbine—configured to generate electric energy.

Wind turbine 1 comprises a supporting structure 2; a nacelle 3 fitted to supporting structure 2 to rotate about an axis A1; a hub 4 connected to nacelle 3 to rotate about an axis A2; a number or quantity of blades 5 fitted to hub 4 and adjustable about respective axes A3; an electric machine 6; an electric transmission 7 (FIG. 2); and a control device 8 configured to control wind turbine 1.

With reference to FIG. 2, wind turbine 1 is configured to generate and feed electric energy to an electric power grid 9.

With reference to FIGS. 1 and 2, electric machine 6 comprises an annular stator 10; and an annular rotor 11 coupled magnetically and mechanically to stator 10 to rotate about axis A2 by a bearing assembly (not shown). In other words, electric machine 6 is an annular electric generator.

Electric machine 6 is connected to electric power grid 9 by electric transmission 7.

Hub 4 is fitted directly to rotor 11 to transfer wind-induced rotation to rotor 11.

Nacelle 3 is fixed to supporting structure 2 to rotate about axis A1 and position hub 4 and blades 5 facing into the wind.

With reference to FIG. 1, hub 4, blades 5, and rotor 11 define a rotary assembly 12 housed partly inside nacelle 3. In the example shown, rotor 11 is housed inside nacelle 3 and supported solely by the bearing assembly at hub 4.

Stator 10 comprises a number or quantity of multiphase—such as, in one embodiment of the disclosure, three-phase—stator windings (not shown) arranged in stator segments.

Rotor 11 is hollow, and comprises a number or quantity of magnetized modules, in particular permanent magnets, arranged in rotor segments.

In the example shown, electric machine 6 is a synchronous, such as a three-phase type; it being understood, however, that the present disclosure applies to any type of rotating electric machine (e.g., asynchronous, such as three-phase electric generators with a squirrel-cage rotor, or synchronous electric generators with a rotor with rotor windings instead of permanent magnets).

Electric transmission 7 comprises a multiphase, in particular three-phase, electric transmission line 18; a switch converter 19 connected to electric machine 6 by multiphase electric transmission line 18; a DC link circuit 20; a switch converter 21 connected to switch converter 19 by DC link circuit 20; and a multiphase electric transmission line 22 configured to connect switch converter 21 to electric power grid 9 at a switch point 23.

Switch converter 19 may comprise a bridge of controlled switches, such as IGBTs, power MOSFETs or others.

Switch converter 21 may also comprise a bridge of controlled switches, such as IGBTs, power MOSFETs or others.

Control device 8 comprises a control unit 30 connected to and configured to control switch converter 19; and a control unit 31 connected to and configured to control switch converter 21.

More specifically, control unit 30 is connected to electric machine 6 to control said stator electric quantities.

Wind turbine 1 comprises a measuring block 35 connected to electric machine 6—more specifically, to multiphase transmission line 18—to determine said stator electric quantities.

Control unit 30 is connected to measuring block 35 to receive the stator electric quantities.

More specifically, the stator electric quantities are stator currents $I_S$ flowing along multiphase transmission line 18.

Measuring block 35 comprises a speed sensor 40 (e.g., an encoder) coupled to the rotor 11 of the electric machine 6 configured to determine the angular speed of rotor 11.

The speed sensor 40 is configured to provide the position of rotor 11.

Control unit 30 is connected to measuring block 35 to receive stator currents $I_S$ and the speed and position of rotor 11. Further, the control unit 30 is supplied by control device 8 with a reference target torque $C_d$ calculated on the basis of the various parameters of wind turbine 1 and defined to maximize efficiency of wind turbine 1.

On the basis of stator currents $I_S$, the speed and position of rotor 11, and reference target torque $C_d$, control unit 30 acts on switch converter 19 so that electric machine 6 exhibits a resisting torque $C_r$ equal to reference target torque $C_d$. In other words, control unit 30 effects a so-called current control.

In an alternative embodiment of the present disclosure, stator currents $I_S$ and/or the speed of rotor 11 and/or the position of rotor 11 are calculated, as opposed to being detected.

Wind turbine 1 comprises a measuring block 36 connected to electric power grid 9 and configured to measure electric quantities of electric power grid 9.

More specifically, the electric quantities of electric power grid 9 are line currents $I_{lin}$ flowing along multiphase transmission line 22, and of which measuring block 36 determines amplitude and phase.

Control unit 31 is connected to measuring block 36 to receive the amplitude and phase of line currents $I_{lin}$.

Wind turbine 1 comprises a measuring block 37 connected to electric machine 6 to measure a stator voltage $V_S$, in particular a linked stator voltage $V_S$, of electric machine 6; a measuring block 38 connected to electric power grid 9 to measure a line voltage $V_{lin}$, in particular a linked line voltage $V_{lin}$, of electric power grid 9; and a measuring block 39 connected to DC link circuit 20 and configured to measure a direct voltage $V_{DC}$ of DC link circuit 20.

Wind turbine 1 comprises a control unit 32 connected to measuring block 37 to receive stator voltage $V_S$ of electric machine 6, to measuring block 38 to receive line voltage $V_{lin}$ of electric power grid 9, and to measuring block 39 to receive direct voltage $V_{DC}$ of DC link circuit 20.

Control unit 32 is connected to and supplies control unit 31 with a command string $S_c$ defined on the basis of line voltage $V_{lin}$ of electric power grid 9 and stator voltage $V_S$ of electric machine 6.

More specifically, command string $S_c$ comprises a logic value indicating the higher of stator voltage $V_S$ and line voltage $V_{lin}$, the value of stator voltage $V_S$, and the value of line voltage $V_{lin}$.

Control unit 32 sends command string $S_c$ to control unit 31, which acts on switch converter 21 on the basis of the electric quantities (i.e., line currents of electric power grid 9), and on the basis of command string $S_c$ in turn determined on the basis of line voltage $V_{lin}$ of electric power grid 9 and stator voltage $V_S$ of electric machine 6.

More specifically, control unit 31 operates so that the voltage $V_{dc}$ of DC link circuit 20 is always proportional to the higher of line voltage $V_{lin}$ of electric power grid 9 and stator voltage $V_S$ of electric machine 6.

In other words, when stator voltage $V_S$ of electric machine 6 is higher than line voltage $V_{lin}$ of electric power grid 9 ($V_S > V_{lin}$), control unit 32 supplies control unit 31 with command string $S_c$ indicating the higher, and the respective values, of stator voltage $V_S$ of electric machine 6 and line voltage $V_{lin}$ of electric power grid 9. And control unit 31 acts on the basis of the electric quantities (i.e., line currents of electric power grid 9, stator voltage $V_S$ of electric machine 6, and line voltage $V_{lin}$ of electric power grid 9). The control unit 31 acts on switch converter 21 so that the direct voltage $V_{DC}$ of DC link circuit 20 is proportional to stator voltage $V_S$ of electric machine 6 according to a predetermined coefficient. In this case ($V_S > V_{lin}$) switch converter 21 is controlled to convert the alternating line voltage $V_{lin}$ of electric power grid 9 to direct voltage $V_{DC}$ and vice versa, and operates so that direct voltage $V_{DC}$ is proportional to stator voltage $V_S$ of electric machine 6, and, in one embodiment, √2 times the peak stator voltage $V_S$ of electric machine 6. In other words, switch converter 21 operates as an AC/DC converter and voltage booster.

Conversely, when line voltage $V_{lin}$ of electric power grid 9 is higher than stator voltage $V_S$ of electric machine 6, control unit 32 supplies control unit 31 with command string $S_c$ indicating $V_{lin} > V_S$ and the value of line voltage $V_{lin}$ of electric power grid 9. And control unit 31, on the basis of the electric quantities (i.e., line currents $I_{lin}$, and line voltage $V_{lin}$ of electric power grid 9), operates so that direct voltage $V_{DC}$ of DC link circuit 20 is proportional to, and, in one embodiment, √2 times, the line voltage $V_{lin}$ of electric power grid 9.

In a variation of the present disclosure, measuring block 37 configured to measure stator voltage $V_S$ of electric machine 6 is eliminated, and control unit 32 is connected to speed sensor 40 of rotor 11, and operates on the basis of the speed of rotor 11 of electric machine 6 (i.e., determines stator voltage $V_S$ of electric machine 6 from the speed of rotor 11 and operates as described previously).

In the FIG. 3 variation of the present disclosure, control unit 32 is connected to and controls control unit 30 by a control signal $S_d$, so that stator voltage $V_S$ of electric machine 6 is less than or equal to line voltage $V_{lin}$. More specifically, control unit 30 current-controls switch converter 19 on the basis of reference target torque $C_d$ and control signal $S_d$. More specifically, control unit 30 modifies the current control described with reference to FIG. 2, to lower stator voltage $V_S$ to the value indicated by control signal $S_d$, by reducing a magnetic flux of electric machine 6.

In another variation of the present disclosure (not shown), the electric machine stator voltage measuring block is eliminated, and the wind turbine comprises an estimating unit connected to the control unit to provide an estimate of the electric machine stator voltage. The control unit operates as described previously.

In a variation of the present disclosure, the stator electric quantities are stator voltages $V_S$, and the electric quantities of electric power grid 9 are line voltages $V^{lin}$, so control units 30 and 31 operate respectively on the basis of stator voltages $V_S$ and line voltages $V_{lin}$ instead of stator currents $I_S$ and line currents $I_{lin}$.

In another variation of the present disclosure (not shown), the wind turbine comprises a further electric machine connected to the wind turbine hub and switch converter 19.

In another variation of the present disclosure (not shown), the wind turbine comprises a further electric machine connected to the wind turbine hub; and a further switch converter connected to the further electric machine and the DC link circuit.

In another variation of the present disclosure (not shown), the wind turbine comprises a further electric machine connected to the wind turbine hub; and a further electric transmission connected to the further electric machine and the electric power grid.

According to the present disclosure, direct voltage $V_{DC}$ is constantly proportional to stator voltage $V_S$ of electric machine 6 or line voltage $V_{lin}$ of electric power grid 9, depending on the operating conditions, thus making it possible to maintain target or practically ideal ratios between direct voltage $V_{DC}$ and stator voltage $V_S$, and between direct voltage $V_{DC}$ and line voltage $V_{lin}$, and so reduce switching losses caused by lower voltages on component parts of switch converters 19 and 21, regardless of the pulse-width modulation technique employed. In known turbines, on the other hand, direct voltage $V_{DC}$ is not controlled, and is set once and for all on the basis of the maximum predicted stator voltage $V_S$ and line voltage $V_{lin}$, which, in actual operating conditions, however, inevitably vary, with negative effects on switching losses.

Wind turbine 1 therefore is configured to, on average, reduce power dissipation of at least one of switch converters 9 and 21.

Moreover, when using the discontinuous pulse-width modulation technique, the above ratios determine the number or quantity of switching operations and the switching losses of switch converters 19 and 21. So the favourable ratios between direct voltage $V_{DC}$ and stator voltage $V_S$ and between direct voltage $V_{DC}$ and line voltage $V_{lin}$ also reduce the number or quantity of switching operations, thus further reducing power dissipation caused by switching losses, at least for one of switch converters 19 and 21.

Clearly, changes may be made to the wind turbine and method described herein without, however, departing from the scope of the accompanying Claims. That is, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A wind turbine configured to generate and feed electric energy to an electric power grid, the wind turbine comprising:
   a blade assembly;
   at least one electric machine configured to generate electric energy, said at least one electric machine including:
   a stator; and
   a rotor connected to the blade assembly;
      a first switch converter connected to the at least one electric machine and configured to control a plurality of stator electric quantities;
      a second switch converter configured to be connected to the electric power grid;
      a DC link circuit configured to connect the first switch converter to the second switch converter; and
      a control device which, by at least one of the first switch converter and the second switch converter, is configured to control a direct voltage in the DC link circuit based on:
      (i) an operating parameter of the at least one electric machine indicating a stator voltage of the at least one electric machine, and
      (ii) a quantity indicating a line voltage of the electric power grid.

2. The wind turbine of claim 1, wherein the plurality of stator electric quantities include a plurality of stator currents, and the first switch converter controls the plurality of stator currents based on a reference target torque, such that the at least one electric machine exhibits a resisting torque equal to the reference target torque.

3. The wind turbine of claim 1, wherein the plurality of stator electric quantities include a plurality of stator voltages, and the first switch converter controls the plurality of stator voltages based on a reference target torque, such that the at least one electric machine exhibits a resisting torque equal to the reference target torque.

4. The wind turbine of claim 1, wherein the second switch converter is configured to be controlled by the control device to:
   keep the direct voltage in the DC link circuit proportional to the stator voltage of the at least one electric machine when the stator voltage is greater than the line voltage of the electric power grid, and
   keep the direct voltage in the DC link circuit proportional to the line voltage of the electric power grid when the line voltage is greater than the stator voltage of the at least one electric machine.

5. The wind turbine of claim 1, wherein the control device includes:
   a first measuring block configured to acquire the operating parameter of the at least one electric machine indicating the stator voltage,
   a second measuring block configured to acquire the quantity indicating the line voltage of the electric power grid,
   a first control unit configured to control the first switch converter, and a second control unit configured to control the second switch converter, said second control unit:
      is connected to the first measuring block to receive the operating parameter of the at least one electric machine,
      is configured to be connected to the second measuring block to receive the quantity indicating the line voltage of the electric power grid, and
      is configured to control the direct voltage in the DC link circuit by the second switch converter, said control of the direct voltage based on:
   the received operating parameter of the at least one electric machine, and the received quantity indicating the line voltage of the electric power grid.

6. The wind turbine of claim 5, wherein the operating parameter of the at least one electric machine includes the stator voltage, and the first measuring block is a measuring instrument configured to measure the stator voltage of the at least one electric machine.

7. The wind turbine of claim 6, wherein the second switch converter is connected to the first measuring block to receive the stator voltage of the at least one electric machine, and the second switch converter is connected to the second measuring block to receive the quantity indicating the line voltage of the electric power grid.

8. The wind turbine of claim 5, wherein the operating parameter of the at least one electric machine includes a speed of the rotor, and the first measuring block includes a speed sensor coupled to the rotor of the at least one electric machine to determine the speed of the rotor.

9. The wind turbine of claim 1, wherein the control device is configured to control the first switch converter, such that the stator voltage of the at least one electric machine is less than or equal to the line voltage of the electric power grid.

10. A method of controlling a wind turbine including a blade assembly, at least one electric machine configured to generate electric energy and including a stator and a rotor connected to the blade assembly, a first switch converter connected to the at least one electric machine to control a plurality of stator electric quantities, a second switch converter configured to be connected to an electric power grid, and a DC link circuit configured to connect the first switch converter to the second switch converter, said method comprising:
   controlling, by at least one of the first switch converter and the second switch converter, a direct voltage in the DC link circuit, said control being based on:
      an operating parameter of the at least one electric machine indicating a stator voltage of the at least one electric machine, and
      a quantity indicating a line voltage of the electric power grid.

11. The method of claim 10, which includes controlling the second switch converter to:
   keep the direct voltage in the DC link circuit proportional to the stator voltage of the at least one electric machine when the stator voltage is greater than the line voltage of the electric power grid, and
   keep the direct voltage in the DC link circuit proportional to the line voltage of the electric power grid when the line voltage is greater than the stator voltage of the at least one electric machine.

12. The method of claim 11, wherein the operating parameter of the at least one electric machine includes the stator voltage of the at least one electric machine.

13. The method of claim 11, wherein the operating parameter of the at least one electric machine includes a speed of the rotor.

14. The method of claim 10, which includes:
   acquiring the operating parameter of the at least one electric machine indicating the stator voltage,
   acquiring the quantity indicating the line voltage of the electric power grid, and
   controlling the direct voltage in the DC link circuit by the second switch converter, said control being based on:
   the acquired operating parameter of the at least one electric machine, and
   the acquired quantity indicating the line voltage of the electric power grid.

15. The method of claim 10, which includes controlling the first switch converter, such that the stator voltage of the at least one electric machine is less than or equal to the line voltage of the electric power grid.

16. A wind turbine controller comprising:
   a first switch converter connected to at least one wind turbine electric machine including a stator, and a rotor connected to a blade assembly, said first switch converter configured to control a plurality of stator electric quantities;
   a second switch converter configured to be connected to an electric power grid;
   a DC link circuit configured to connect the first switch converter to the second switch converter; and
   a control device which, by at least one of the first switch converter and the second switch converter, is configured to control a direct voltage in the DC link circuit based on:
   (i) an operating parameter of the at least one wind turbine electric machine indicating a stator voltage of the at least one wind turbine electric machine, and
   (ii) a quantity indicating a line voltage of the electric power grid.

17. The wind turbine controller of claim 16, wherein the second switch converter is configured to be controlled by the control device to:
   keep the direct voltage in the DC link circuit proportional to the stator voltage of the at least one wind turbine electric machine when the stator voltage is greater than the line voltage of the electric power grid, and
   keep the direct voltage in the DC link circuit proportional to the line voltage of the electric power grid when the line voltage is greater than the stator voltage of the at least one wind turbine electric machine.

18. The wind turbine controller of claim 16, wherein the control device is configured to control the first switch converter, such that the stator voltage of the at least one wind turbine electric machine is less than or equal to the line voltage of the electric power grid.

19. The wind turbine controller of claim 16, wherein the control device includes:
   a first measuring block configured to acquire the operating parameter of the at least one wind turbine electric machine indicating the stator voltage,
   a second measuring block configured to acquire the quantity indicating the line voltage of the electric power grid,
   a first control unit configured to control the first switch converter, and
   a second control unit configured to control the second switch converter, said second control unit:
      is connected to the first measuring block to receive the operating parameter of the at least one wind turbine electric machine,
      is configured to be connected to the second measuring block to receive the quantity indicating the line voltage of the electric power grid, and
      is configured to control the direct voltage in the DC link circuit by the second switch converter, said control of the direct voltage based on:
   the received operating parameter of the at least one wind turbine electric machine, and
   the received quantity indicating the line voltage of the electric power grid.

20. The wind turbine controller of claim 19, wherein the operating parameter of the at least one wind turbine electric machine includes the stator voltage, and the first measuring block is a measuring instrument configured to measure the stator voltage of the at least one wind turbine electric machine.

21. The wind turbine of claim 19, wherein the operating parameter of the at least one wind turbine electric machine includes a speed of the rotor, and the first measuring block includes a speed sensor coupled to the rotor of the at least one wind turbine electric machine to determine the speed of the rotor.

* * * * *